United States Patent
Ripoche et al.

(10) Patent No.: US 6,715,321 B1
(45) Date of Patent: Apr. 6, 2004

(54) METHOD OF FABRICATING AN OPTICAL FIBER PREFORM INCLUDING OUTSIDE DEPOSITION OF SILICA, POSSIBLY DOPED SILICA

(75) Inventors: Pierre Ripoche, Pithiviers (FR); Alain Drouart, Nanterre (FR); Benoît Gouez, Acheres (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/519,847

(22) Filed: Mar. 6, 2000

(30) Foreign Application Priority Data

Mar. 8, 1999 (FR) .............................. 99 02815

(51) Int. Cl.⁷ .............................................. C03B 37/07
(52) U.S. Cl. ............................. 65/377; 65/421; 65/391; 65/404; 65/484
(58) Field of Search ................. 65/377, 421, 391, 65/404, 484, 413, 530

(56) References Cited

U.S. PATENT DOCUMENTS

| | | | |
|---|---|---|---|
| 4,221,825 A | 9/1980 | Guerder | 63/391 |
| 4,235,616 A | 11/1980 | Siegfried | 65/418 |
| 4,265,649 A | 5/1981 | Achener | 65/421 |
| 4,331,462 A | 5/1982 | Fleming | 65/391 |
| 4,378,987 A | 4/1983 | Miller | 65/421 |
| 4,417,911 A | 11/1983 | Cundy | 65/391 |
| 4,568,370 A | 2/1986 | Powers | 65/421 |
| 4,728,350 A | 3/1988 | Cocito | 65/418 |
| 4,826,288 A | 5/1989 | Mansfield | 65/418 |
| 4,846,867 A * | 7/1989 | Yokota et al. | 65/397 |
| 4,872,895 A * | 10/1989 | Fleming et al. | 423/338 |
| 5,194,714 A | 3/1993 | Le Sergent | 65/421 |
| 5,958,102 A | 9/1999 | Shimada | 65/421 |

FOREIGN PATENT DOCUMENTS

| | | | |
|---|---|---|---|
| EP | 303 533 | 2/1989 | ................. 65/377 |
| EP | 0 440 130 A1 | 8/1991 | |
| EP | 0 450 465 A1 | 10/1991 | |
| EP | 490 059 | 6/1992 | ................. 65/530 |
| EP | 0 719 738 A2 | 7/1996 | |
| EP | 0 875 489 A1 | 11/1998 | |
| FR | 2 446 264 | 8/1980 | |
| JP | 60-45133 | 10/1985 | ................. 65/421 |
| JP | 63-74932 | 4/1988 | ................. 65/377 |
| JP | 3-295827 | 12/1991 | ................. 65/421 |
| JP | 4-160028 | 10/1992 | ................. 65/421 |
| JP | 4-292434 | 10/1992 | ................. 65/421 |

* cited by examiner

*Primary Examiner*—John Hoffmann
(74) *Attorney, Agent, or Firm*—Sughrue Mion, PLLC

(57) ABSTRACT

A method of fabricating an optical fiber preform is disclosed which includes a step of outside deposition of silica possibly doped with at least one dopant by injecting at least one substance in the form of silica or a precursor of silica in the vicinity of a heating area created by a heating system during at least one pass of an injector system and the heating system along a longitudinal axis of the preform during which the relative positions of the injector and heating systems ore adjusted so that silica is deposited in the heated area regardless of the position of the heating system.

4 Claims, 4 Drawing Sheets

METHOD OF FABRICATING AN OPTICAL FIBER PREFORM INCLUDING OUTSIDE DEPOSITION OF SILICA, POSSIBLY DOPED SILICA

BACKGROUND OF THE INVENTION

1. Field of the Invention

The present invention relates to a method of fabricating an optical fiber preform including a step of outside deposition of silica possibly doped with at least one dopant by injecting at least one substance in the form of silica or a precursor of silica in the vicinity of a heating area created by heating means during at least one pass of injector means and the heating means along a longitudinal axis of the preform. It also relates to a preform obtained by the above method and an optical fiber fabricated by drawing the above preform.

2. Description of the Prior Art

Using an outside lateral deposition technique such as the plasma surfacing technique to fabricate a preform, which is subsequently drawn to fabricate an optical fiber, from another preform referred to as the primary preform, which includes the optical guide part of the optical fiber obtained from the preform, is known in the art and described in patent application EP 0 450 465 A1, for example.

The optogeometrical characteristics of an optical fiber determine transmission characteristics. They include the geometry of the fiber, in particular the surfaces of the various concentric parts of the fiber when seen in cross section, and the optical characteristics of these various parts. These optogeometrical characteristics are derived from those of the preform from which the optical fiber is fabricated.

Patent application EP 0 719 738 A1 describes a method of obtaining optical fiber preforms using a plasma surfacing process, i.e. an outside deposition process using a plasma torch as the heating means, in which method silica, possibly doped silica, and generally in the form of grains of silica, is injected into the torch and at least one plasma surfacing pass is modulated to improve the optogeometrical properties of the preform. The surfacing pass which is modulated is one of the final surfacing passes; during unmodulated passes the thickness of the surfacing layer deposited is substantially constant along the usable port of the preform. The surfacing process is modulated principally by controlled axial modification of at least one plasma surfacing parameter, preferably the flowrate of the surfacing grains. The axial modification process includes evaluating axial diameter errors of the preform and axially modifying the parameter in a direction such that the modulated surfacing pass reduces the axial diameter errors. In other words, the surfacing pass is modulated according to axial diameter errors previously determined and adds to—or subtracts from—the diameter of the preform so that the errors are reduced—or even eliminated—after the surfacing pass.

However, in patent application EP 0 719 738 A1 the outside deposition yield is not optimized: the injector means, in this instance for injecting grains, are permanently positioned relative to the plasma torch throughout the duration of outside deposition. The heating means (the plasma torch). do not operate symmetrically about their axis on the reactive gases or particles leaving the injector means, principally because of the vortex flow of the plasma gases in the torch and at the outlet from the torch. Consequently, in an outside deposition process alternating deposition passes in opposite directions, the position of the injector means in the prior art typically represents a compromise. Its position is between an optimum position in one direction of translatory movement of the preform and an optimum position in the other direction of translatory movement of the preform. Consequently, the outside deposit is not optimized, in particular in terms of the yield; the reactive gases or grains leaving the injector means and which have not reacted in the heating area of the heating means are purely and simply eliminated without having been able to react.

With a process of the above kind it is also difficult to deposit dopants such as fluorine with some rates of incorporation into the preform. The position of the injector means can make it impossible to obtain correct doped reactant deposition reaction kinetics, principally in terms of temperature and the distance to be traveled by the reactants leaving the injector means if the reactants are gases. Fluorine, for example, is too reactive and, instead of silica and fluorinated substance being deposited on the preform, an unwanted compound $SiF_4$ is formed which is not incorporated into the preform. In the worst case scenario not only is the fluorine dopant not incorporated into the preform but it also impedes or even prevents the deposition of silica on the preform.

In the context of the outside vapor deposit (OVD) technology, in which an outside deposit of possibly doped silica is produced by a succession of outside deposit passes of soot in the presence of the heating means, which are generally in the form of an oxyhydride torch, vitrification occurring after such deposition, generally in an oven, the problem also arises of optimizing the outside deposit, in, addition to the problem of depositing some dopants under some conditions. It is also feasible to form an OVD deposit by using a plasma torch as the heating means instead of an oxyhydride torch.

The method of the invention aims principally to increase the deposition yield of the outside deposit process by optimizing the position of the injector means relative to the heating means. It also aims to enable simultaneous deposition of dopants and silica under good conditions.

SUMMARY OF THE INVENTION

The invention provides a method of fabricating an optical fiber preform including a step of outside deposition of silica possibly doped with at least one dopant by injecting at least one substance in the form of silica or a precursor of silica in the vicinity of a heating area created by heating means during at least one pass of injector means and the heating means along a longitudinal axis of the preform during which the relative positions of the injector means and the heating means are adjusted so that the silica is deposited in the heated area regardless of the position of the heating means.

In the case of direct vitrification, where possibly doped silica soot is deposited and the soot is simultaneously vitrified, it is very important to obtain a good quality preform, and in particular for no bubbles to be incorporated in the preform. While significantly improving the silica deposition yield, generally by 20% to 30% compared to a compromise position of the injector means, the method of the invention has the advantage of producing a high-quality deposit essentially free of bubbles.

The method according to the invention also has the advantage, principally in the case of injecting gaseous reactants, of obtaining some levels of dopants in the silica deposited by the surfacing process which a standard position of the injector means cannot achieve well, if at all.

The adjustment is advantageously carried out at each change of pass.

The method of the invention therefore has the advantage, principally in the case of depositing grains in both surfacing pass directions, at constant deposit quality, of increasing the rate of deposition of the particles deposited on the preform in a lateral surfacing layer, compared to the process in which the injector means are fixed at a particular position throughout the surfacing process.

In one embodiment of the invention the heating means have a main axis in a plane substantially perpendicular to the longitudinal axis of the preform, the injector means have a main axis at a fixed angle to the main axis of the heating means in a plane substantially perpendicular to the longitudinal axis of the preform and the injector means and the heating means move relative to each other in a direction parallel to the longitudinal axis of the preform.

In this configuration the orientations of the principal axes of the injector means and the heating means are conventional for the process of outside deposition of possibly doped silica, principally in the case of plasma surfacing, and the method of the invention can easily be adapted to existing systems. The relative movement of the injector means and the heating means is performed with their axes remaining in a plane perpendicular to the longitudinal axis of the preform and with a constant angle between the axes. It is therefore easy to automate the relative position of the injector means and the heating means on existing systems.

The heating means according to the invention are generally in the form of a plasma torch, principally in the case of the plasma technology, but also in the case of the OVD technology.

If there are at least two injectors, the foregoing remarks apply to each of the injectors. In this case the injectors are generally situated in a common plane substantially perpendicular to the longitudinal axis of the preform.

In the case of a deposit of undoped silica, whether deposited by injecting grains or by injecting reactive gases, the positioning of the injector means, which in this case is principally dependent on the direction of translatory movement of the preform relative to the heating means, is generally continuously adjusted as the preform is fabricated. This can be effected by measuring the diameter continuously, as described in patent application EP 0 719 738 A1 in the situation where the heating means are in the form of a plasma torch. The position of the injector means according to the invention can also be evaluated and adjusted by calibration on preforms used as test preforms.

In the case of depositing doped silica, usually by injecting reactive gases, the position of the injector means is generally determined by calibration on preforms used as test preforms. In this case their position is principally dependent on the direction of movement of the preform in translation relative to the heating means and the doping required at a given diameter of the preform, depending on the required refractive index profile. Calibration using one or two test preforms must therefore evaluate different positions of the injector means relative to the heating means as a function of the speed of translatory movement for a given refractive index profile.

The invention will be better understood and other features and advantages of the invention will become apparent on reading the following description which is given by way of non-limiting example with reference to FIGS. 1 to 5.

DETAILED DESCRIPTION OF THE PREFERRED EMBODIMENT

Figure 1:
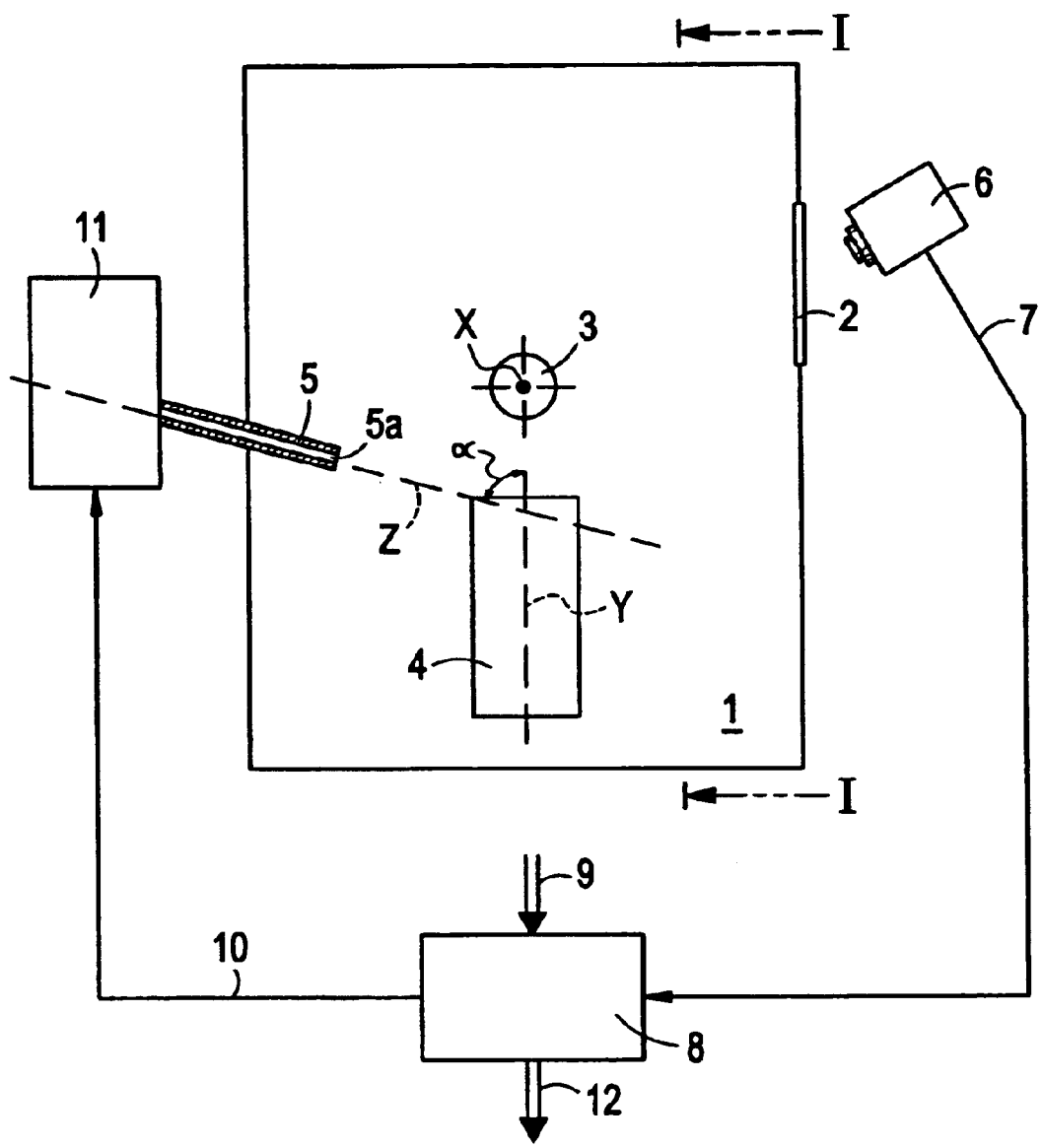
FIG. 1 is a highly diagrammatic representation of a plasma surfacing system in which the method of the invention can be implemented.
Figure 6:
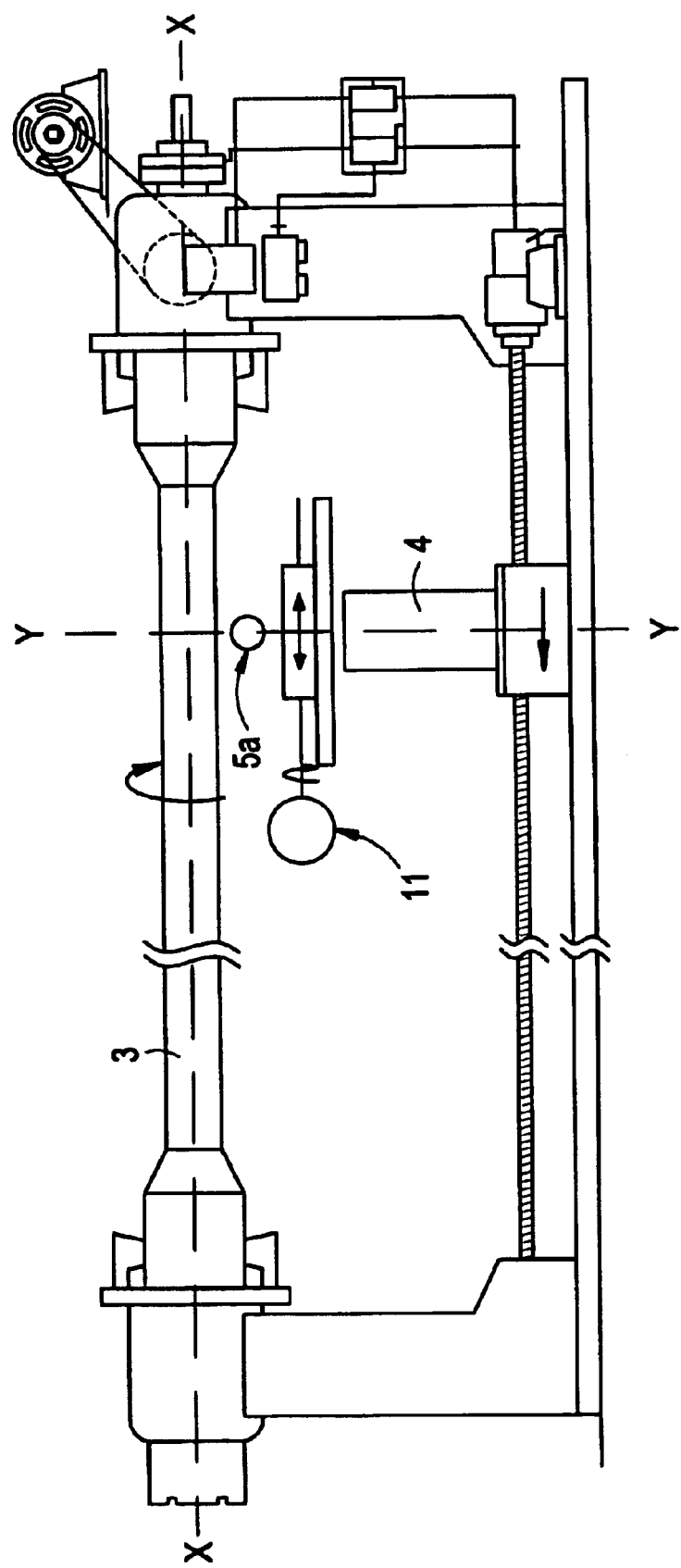
FIG. 6 is another diagrammatic view of a plasma surfacing system in which the movement of the heating and injection means is shown.

FIGS. 1 and 6 show a plasma surfacing system including an enclosure 1 which has a transparent window 2, a preform 3 which is seen end on (in FIG. 1) and onto which are directed a plasma torch 4 which constitutes the heating means in accordance with the invention and a nozzle 5 feeding surfacing grains which has an orifice 5a and constitutes the injector means according to the invention. Outside the enclosure 1 is a CCD video camera 6 behind the window 2 and pointing toward the preform 3, which has a longitudinal axis X. It provides a measurement of the diameter of the preform at the location at which it points in the form of a value transmitted by a link 7 to a device 8 controlling the surfacing process. The device 8 receives over a multiple link 9 other information on surfacing process conditions. Under the control of an internal program controlling the surfacing process, and for a constant flowrate of the grains, the device 8 provides on an output link 10 feeding a control device 11 a command which positions the nozzle relative to the torch 4 and the preform 3 by moving the nozzle 5 along an axis parallel to the longitudinal axis X of the preform 3. The reference value is that for which the nozzle 5 and the torch 4 are in a common plane substantially perpendicular to the axis of the preform. The device 8 also supplies on a multiple output link 12 other command values determining other aspects of the control process.

As shown in FIGS. 1 and 6, the torch 4 has a main axis Y in a plane substantially perpendicular to the longitudinal axis X of the preform 3. The nozzle 5 has a main axis Z at a fixed angle a to the main axis Y of the torch 4, in a plane substantially perpendicular to the longitudinal axis X of the preform 3.

All the components of the system shown in FIG. 1 are well known to the skilled person. Other components which are not shown in detail are equally well known. Thus means for supporting the preform 3 with rotary and translatory drive parallel to the longitudinal axis of the preform 3, and means for evaluating the angular position of the preform 3 and the longitudinal position of the carriage are shown in FIG. 6 and described in European patent application EP 0 440 130 A1, for example. According to the invention, the carriage supporting the nozzle 5 and the torch 4 also includes internal means for supporting the nozzle 5 with translatory drive for positioning the nozzle 5 relative to the torch 4. In a manner that is well known in the art, all these means are used to move the preform 3 away from the torch 4 as the preform 3 grown larger. The camera 6 is pointed at successive locations of the preform 3 along a measurement path by means which could take the form of a second carriage, movement of which is coupled to that of the first carriage, also as in the prior art.

Figure 2:
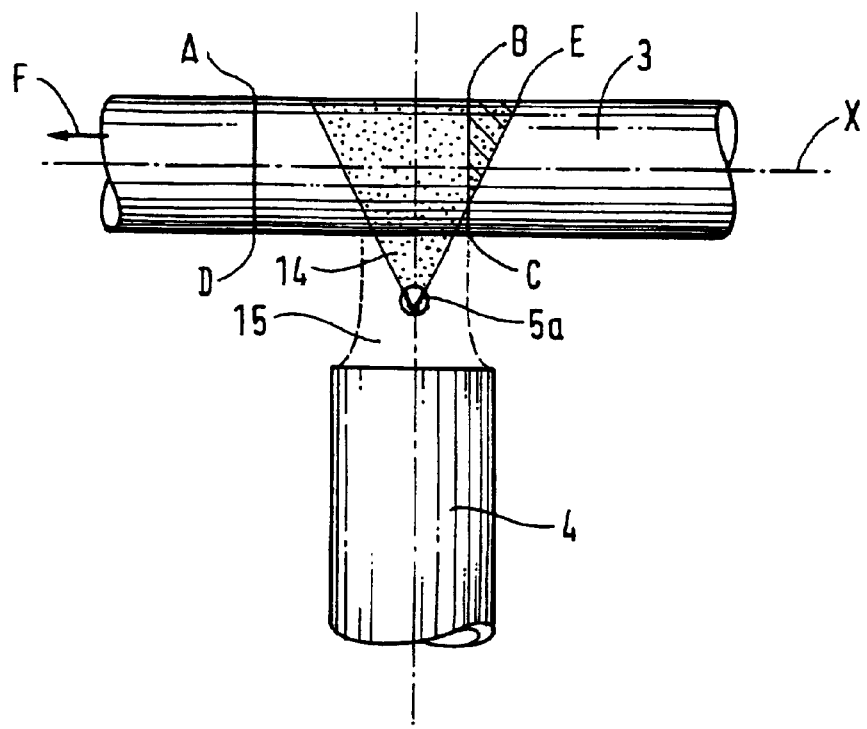
FIG. 2 is a diagrammatic view taken along the line I—I in FIG. 1 of the various components of the system shown in FIG. 1 in a prior art position which represents a compromise and in the case of leftward translatory movement of the preform 3 relative to the nozzle 5 and the torch 4.
Figure 3:
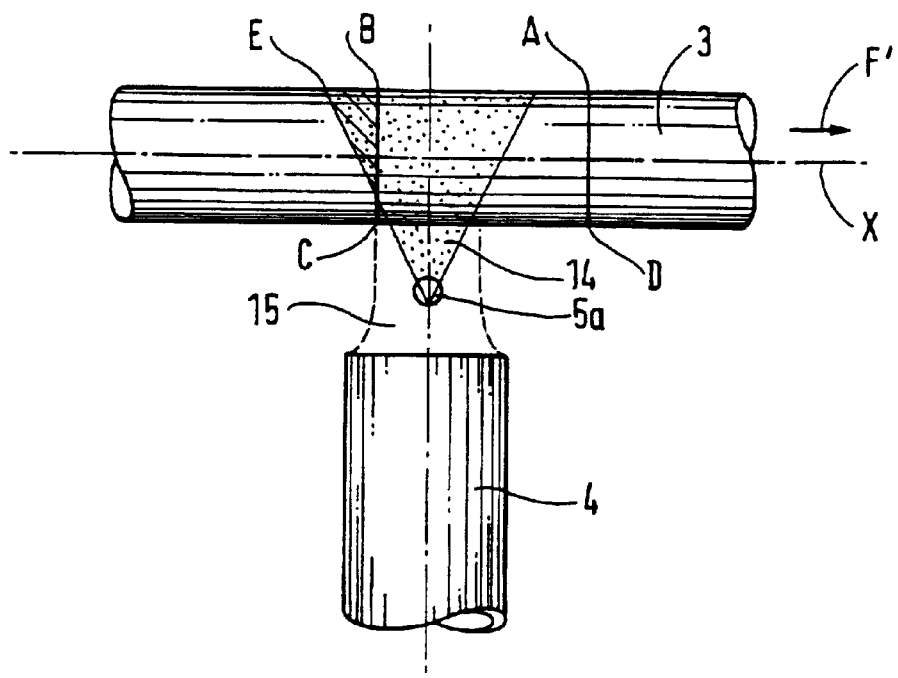
FIG. 3 is a diagrammatic view taken along the line I—I in FIG. 1 of the various components of the system shown in FIG. 1 in a prior art position which represents a compromise and in the case of rightward translatory movement of the preform 3 relative to the nozzle 5 and the torch 4. The difference compared to FIG. 2 is the direction of translatory movement.
Figure 4:
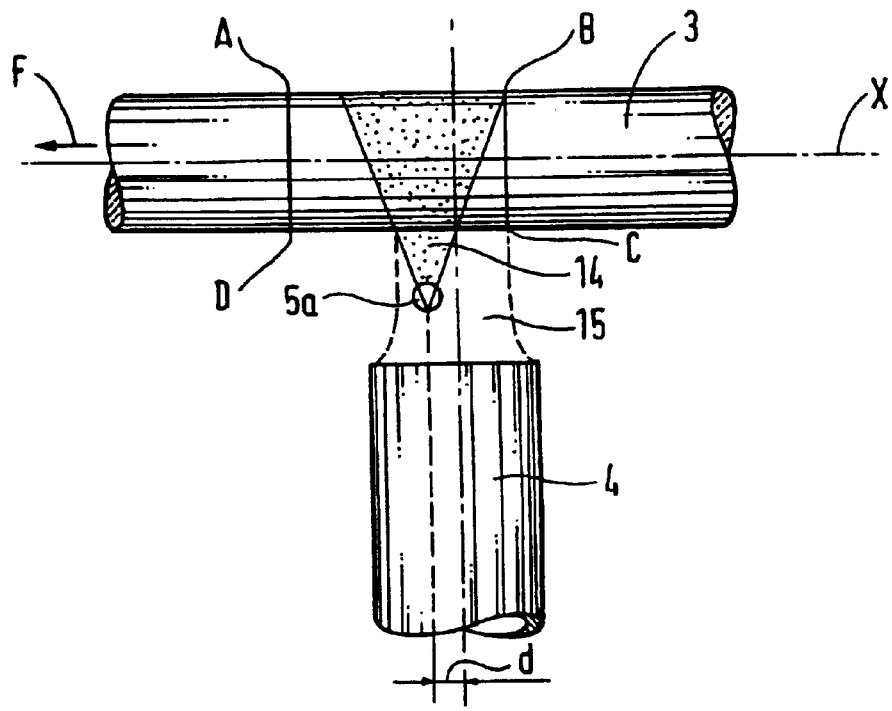
FIG. 4 is a diagrammatic view taken along the line I—I in FIG. 1 of the components of the system shown in FIG. 1 in a position optimized in accordance with the invention in the case of leftward translation of the preform 3 relative to the nozzle 5 and the torch 4.
Figure 5:
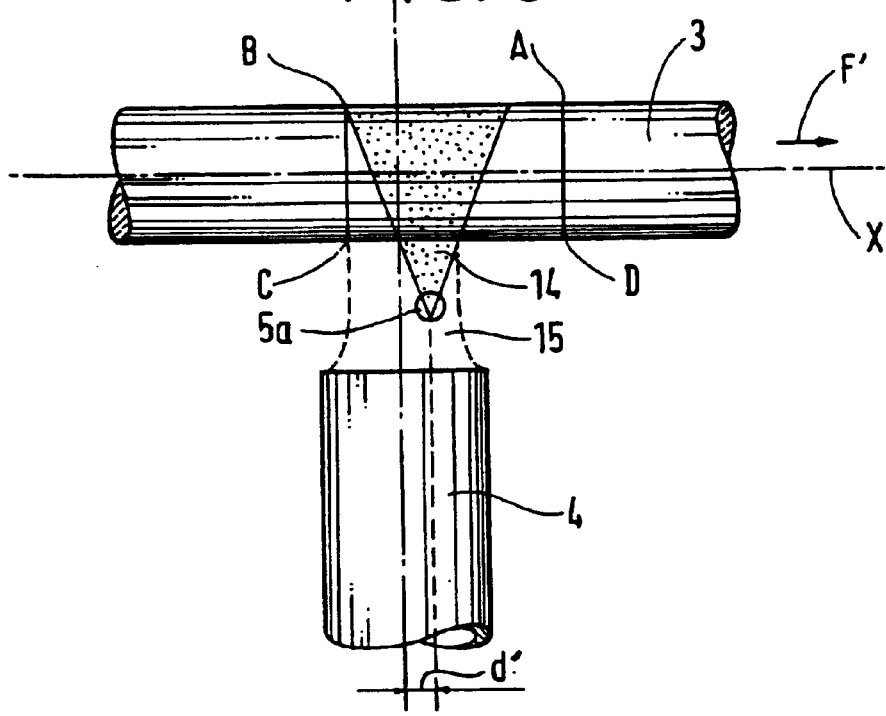
FIG. 5 is a diagrammatic view taken along the line I—I in FIG. 1 of the components of the system shown in FIG. 1 in a position optimized in accordance with the invention in the case of rightward translation of the preform 3 relative to the nozzle 5 and the torch 4. The difference compared to FIG. 4 is the direction of translatory movement.

The plasma surfacing is effected by alternating passes from right to left and from left to right during which the plasma torch 4 and the nozzle 5 are swept along the length of the preform 3 as shown in FIG. 6. In accordance with the invention, the position of the nozzle 5 relative to the torch 4 is preferably changed at each change in the direction of translatory movement of the torch 4 relative to the preform 3 at the end of a pass. In FIGS. 2 and 3, which are described later, the position of the nozzle 5 relative to the torch 4 in the prior art is typically fixed for every pass and therefore exactly the same regardless of the direction of translatory movement of the preform 3 relative to the torch 4. In FIGS. 4 and 5, which are described later, the position of the nozzle 5 in accordance with the invention is different for each direction of translatory movement of the preform 3 relative to the torch 4 and is modified on each change of direction of translatory movement, but can also vary during the process, being slaved to the diameter of the preform.

All of the control process is optimized to obtain a high yield in terms of the quantity of silica deposited at a given speed of translatory movement and for a given refractive index profile of the surfacing. The camera 6 simultaneously performs a measurement pass providing successive values of the diameter of the preform 3 throughout its length.

FIG. 2 is a diagrammatic view of the various components of the system shown in FIG. 1 in a prior art position which represents a compromise in the case of leftward translatory movement (arrow F) of the preform 3 relative to the nozzle 5 and the torch 4. The arrow F indicates the direction of translatory movement of the preform 3. The nozzle 5 is symbolized by its orifice 5a. A cone 14 of deposition of reactive gases or particles leaving the nozzle 5 and a plasma 15 issuing from the plasma torch 4 are shown. The cone 14 overlaps a hot area ABCD of the preform 3 and there is a cold area BCE of said cone 14, shown shaded in FIG. 2. As previously explained, deposition by this process in the cold area has the drawback of reducing the yield of the deposit, or even of preventing it altogether in the case of some doponts.

FIG. 3 is a diagrammatic representation of the components of the system shown in FIG. 1 in a prior art position which represents a compromise in the case of rightward translation (arrow F') of the preform 3 relative to the nozzle 5 and the torch 4. The arrow P indicates the direction of translatory movement of the torch. As in FIG. 2, the cone 14 of deposition of the reactive gases or particles leaving the nozzle 5 via the orifice 5a and the plasma 15 and the hot area ABCD of the preform 3 are shown. The cone 14 overlaps the hot area ABCD and there is a cold area BCE.

FIG. 4 is a diagrammatic representation of the components of the system shown in FIG. 1 in a position optimized in accordance with the invention in the case of leftward translatory movement of the preform 3 relative to the nozzle 5 and the torch 4. Downstream of the torch refers to the part of the torch which has already undergone deposition during the pass shown. The axis of the nozzle 5 is at a distance d from the axis of the torch 4, on its downstream side relative to the direction of translatory movement of the preform 3 relative to the torch 4. Consequently the cone 14 of deposition of the gases or particles leaving the nozzle 5 via the orifice 5a impinges totally on the hot area ABCD of the preform 3. There is no cold area.

FIG. 5 is a diagrammatic representation of the components of the system shown in FIG. 1 in a position that is optimized in accordance with the invention in the case of rightward translatory movement of the preform 3 relative to the nozzle 5 and the torch 4. The axis of the nozzle 5 is at a distance d from the axis of the torch 4 equal to the distance d shown in FIG. 4 and on its downstream side relative to the direction of translatory movement of the preform 3 relative to the torch 4. Consequently the cone 14 of deposition of the gases or particles leaving the nozzle 5 via the orifice 5a impinges totally on the hot area ABCD of the preform 3. There is no cold area. More generally, the heating means are not cylindrically symmetrical. The axis of the nozzle 5 is at a distance d', which is not equal to the distance d shown in FIG. 4, from the axis of the torch 4, on its downstream side relative to the direction of translatory movement of the preform 3 relative to the torch 4.

The foregoing description relates to the situation in which relative movement of the heating means in the form of the torch 4 and the injector means in the form of the nozzle 5 is obtained by moving the injector means relative to the heating means. Of course, it is equally possible in the context of the invention for the heating means to move relative to the injector means, with substantially the some result.

Of course, the method of the invention is not limited to the representations described above. In particular, it can be used for plasma surfacing processes and also for other surfacing processes such as the OVD process.

What is claimed is:

1. A method of fabricating an optical fiber preform including a step of outside deposition of silica possibly doped with at least one dopant, comprising:

injecting at least one substance, with an injector means, in the form of silica or a precursor of silica, in a heated area created by heating means during at least one pass of said heating means and said injector means, wherein said injector means is associated with said heating means, wherein said at least one pass is along a longitudinal axis of said preform, during which the relative positions of said injector means and said heating means are adjusted with respect to each other, so that said silica is deposited in said heated area regardless of the position of said heating means, and wherein said heating means is a plasma torch.

2. The method claimed in claim 1, wherein said adjustment is carried out between each of said at least one pass and the next.

3. The method claimed in claim 1 wherein said plasma torch has a main axis in a plane, said injector means has a main axis in a plane, wherein a fixed angle is defined by the intersection of said plane of said plasma torch and said plane of said injector means, and said injector means and said plasma torch move relative to each other, within their respective planes, in a direction parallel to said longitudinal axis of said preform.

4. The method claimed in claim 1, wherein said heating means has a longitudinal axis and said injector means is offset from the longitudinal axis by a predetermined distance.

* * * * *